(12) United States Patent
Maguire (10) Patent No.: US 10,201,915 B2
(45) Date of Patent: *Feb. 12, 2019

(54) GRAVIMETRIC BLENDER WITH POWER HOPPER COVER

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 591 days.

This patent is subject to a terminal disclaimer.

(21) Appl. No.: 14/707,094

(22) Filed: May 8, 2015

(65) Prior Publication Data

US 2015/0239150 A1  Aug. 27, 2015

Related U.S. Application Data

(60) Continuation-in-part of application No. 14/666,599, filed on Mar. 24, 2015, which is a division of
(Continued)

(51) Int. Cl.
*B29B 7/24* (2006.01)
*B01F 5/26* (2006.01)
(Continued)

(52) U.S. Cl.
CPC ............ *B29B 7/24* (2013.01); *B01F 3/184* (2013.01); *B01F 5/26* (2013.01); *B01F 15/0235* (2013.01);
(Continued)

(58) Field of Classification Search
USPC .................................. 366/76.9, 141
See application file for complete search history.

(56) References Cited

U.S. PATENT DOCUMENTS 540,154 A 5/1895 Dreisoerner
600,233 A 5/1898 Palm
(Continued)

FOREIGN PATENT DOCUMENTS

CA 1100402 5/1981
DE 1255582 11/1967
(Continued)

OTHER PUBLICATIONS

Maguire Products, Inc., "Weigh Scale Blender Technical Information—Specifications, Features" Nov. 4, 1994.
(Continued)

*Primary Examiner* — Mark Halpern
(74) *Attorney, Agent, or Firm* — Fox Rothschild LLP (57) ABSTRACT

A gravimetric blender has a frame, at least one material storage hopper at the top of the frame including a hopper cover, a weigh bin located within the frame, below the hopper, for receipt of material from the hopper to be weighed and being adapted for downward discharge of the material in the bin after the material received from the hopper has been weighed, at least one load cell connecting the weigh bin to the frame for sensing the weight of contents of the weigh bin, a mixer within the frame below the hopper, for mixing material weighed in the weigh bin after that material falls downwardly from the weigh bin to the mixer, and a guide adapted for vertical movement of the hopper cover therealong between positions which the cover contacts and thereby closes the hopper and at which the cover is spaced vertically but maintained in a horizontal plane above the hopper so that the hopper is open at the top.

5 Claims, 4 Drawing Sheets

Related U.S. Application Data application No. 13/345,856, filed on Jan. 9, 2012, now Pat. No. 9,010,988, which is a division of application No. 11/454,291, filed on Jun. 17, 2006, now Pat. No. 8,092,070.

(51) Int. Cl.
  *B01F 15/02* (2006.01)
  *B01F 15/04* (2006.01)
  *B01F 3/18* (2006.01)
  *B29B 7/12* (2006.01)

(52) U.S. Cl.
  CPC ............ *B01F 15/0445* (2013.01); *B29B 7/12* (2013.01); *B29B 7/244* (2013.01)

(56) References Cited

U.S. PATENT DOCUMENTS

| | | |
|---|---|---|
| 753,597 A | 3/1904 | Long |
| 937,096 A | 10/1909 | Schmid |
| 1,451,759 A | 4/1923 | Bruhn |
| 1,489,348 A | 4/1924 | Hampton |
| 1,520,017 A | 12/1924 | Denton |
| 2,161,190 A | 6/1939 | Paull |
| 2,188,646 A | 1/1940 | Bunch |
| 2,199,657 A | 5/1940 | Bunch |
| 2,550,240 A | 4/1951 | Geiger et al. |
| 2,587,338 A | 2/1952 | Lee et al. |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,893,602 A | 7/1959 | Barber et al. |
| 2,909,315 A | 10/1959 | Sampietro |
| 3,111,115 A | 11/1963 | Best |
| 3,115,276 A | 12/1963 | Johanningmeier |
| 3,138,117 A | 6/1964 | Dorey |
| 3,209,898 A | 10/1965 | Beebe et al. |
| 3,228,563 A | 1/1966 | Rankin et al. |
| 3,252,531 A | 5/1966 | Mayer et al. |
| 3,348,848 A | 10/1967 | Lucking et al. |
| 3,410,530 A | 11/1968 | Gilman |
| 3,470,994 A | 10/1969 | Schnell et al. |
| 3,476,358 A | 11/1969 | Westerlund et al. |
| 3,518,033 A | 6/1970 | Anderson |
| 3,702,140 A | 11/1972 | O'Connor |
| 3,733,012 A | 5/1973 | Grun |
| 3,735,641 A | 5/1973 | Bink et al. |
| 3,814,388 A | 6/1974 | Jakob |
| 3,822,866 A | 7/1974 | Daester et al. |
| 3,853,190 A | 12/1974 | Delesdernier |
| 3,871,629 A | 3/1975 | Hishida |
| 3,957,399 A | 5/1976 | Siczek |
| 3,959,636 A | 5/1976 | Johnson et al. |
| 3,967,815 A | 7/1976 | Backus et al. |
| 3,985,262 A | 10/1976 | Nauta |
| 3,985,345 A | 10/1976 | Jakob |
| 3,988,088 A | 10/1976 | King et al. |
| 3,989,229 A | 11/1976 | Nogushi et al. |
| 3,998,103 A | 12/1976 | Bjorklund et al. |
| 4,014,462 A | 3/1977 | Robertson |
| 4,026,442 A | 5/1977 | Orton |
| 4,037,827 A | 7/1977 | Davison |
| 4,103,357 A | 7/1978 | Nogushi et al. |
| 4,108,334 A | 8/1978 | Moller |
| 4,148,100 A | 4/1979 | Moller |
| 4,185,948 A | 1/1980 | Maguire |
| 4,219,136 A | 8/1980 | Williams et al. |
| 4,339,277 A | 7/1982 | Schult |
| 4,354,622 A | 10/1982 | Wood |
| 4,364,666 A | 12/1982 | Keyes |
| 4,391,140 A | 7/1983 | Reinhard et al. |
| 4,394,941 A | 7/1983 | Recine |
| 4,402,436 A | 9/1983 | Hellgren |
| 4,454,943 A | 6/1984 | Moller |
| 4,459,028 A | 7/1984 | Bruder et al. |
| 4,473,173 A | 9/1984 | DeGroff et al. |
| 4,475,672 A | 10/1984 | Whitehead |
| 4,498,783 A | 2/1985 | Rudolph |
| 4,499,962 A | 2/1985 | Izumi |
| 4,501,405 A | 2/1985 | Usry |
| 4,505,407 A | 3/1985 | Johnson |
| 4,522,321 A | 6/1985 | Kinoshita |
| 4,525,071 A | 6/1985 | Horowitz et al. |
| 4,544,279 A | 10/1985 | Rudolph |
| 4,552,235 A | 11/1985 | Brunnschweiler |
| 4,571,416 A | 2/1986 | Jarzombek et al. |
| 4,581,704 A | 4/1986 | Mitsukawa |
| 4,586,882 A | 5/1986 | Tseng |
| 4,606,710 A | 8/1986 | Maguire |
| 4,619,379 A | 10/1986 | Biehl |
| 4,621,990 A | 11/1986 | Forsythe et al. |
| 4,629,410 A | 12/1986 | Hehl |
| 4,657,490 A | 4/1987 | Abbott |
| 4,705,083 A | 11/1987 | Rossetti |
| 4,733,971 A | 3/1988 | Pratt |
| 4,756,348 A | 7/1988 | Moller |
| 4,793,711 A | 12/1988 | Ohlson |
| 4,812,048 A | 3/1989 | Neumann et al. |
| 4,830,508 A | 5/1989 | Higuchi et al. |
| 4,848,534 A | 7/1989 | Sandwall |
| 4,850,703 A | 7/1989 | Hanaoka et al. |
| 4,895,450 A | 1/1990 | Holik |
| 4,957,176 A | 9/1990 | Roth |
| 4,967,940 A | 11/1990 | Blette et al. |
| 5,039,279 A | 8/1991 | Natwick et al. |
| 5,074,519 A | 12/1991 | Pettus |
| 5,090,450 A | 2/1992 | Pelech et al. |
| 5,096,302 A | 3/1992 | Durina |
| 5,110,521 A | 5/1992 | Moller |
| 5,116,547 A | 5/1992 | Tsukahara et al. |
| 5,116,548 A | 5/1992 | Tsukahara et al. |
| 5,125,535 A | 6/1992 | Ohlman |
| 5,132,897 A | 7/1992 | Allenberg |
| 5,143,166 A | 9/1992 | Hough |
| 5,148,943 A | 9/1992 | Moller |
| 5,161,714 A | 11/1992 | Neumann et al. |
| 5,172,489 A | 12/1992 | Moller |
| 5,199,852 A | 4/1993 | Danby |
| 5,213,724 A | 5/1993 | Saatkamp |
| 5,215,215 A | 6/1993 | Sauer |
| 5,217,108 A | 6/1993 | Newnan |
| 5,219,224 A | 6/1993 | Pratt |
| 5,225,210 A | 7/1993 | Shimoda |
| 5,240,324 A | 8/1993 | Phillips et al. |
| 5,243,455 A | 9/1993 | Ricciardi et al. |
| 5,252,008 A | 10/1993 | May, III et al. |
| 5,261,743 A | 11/1993 | Moller |
| 5,282,548 A | 2/1994 | Ishihara |
| 5,285,930 A | 2/1994 | Nielsen |
| 5,340,949 A | 8/1994 | Fujimura et al. |
| 5,341,961 A | 8/1994 | Hausam |
| 5,344,232 A | 9/1994 | Nelson et al. |
| 5,364,242 A | 11/1994 | Olsen |
| 5,379,923 A | 1/1995 | Sagastegui et al. |
| 5,423,455 A | 6/1995 | Ricciardi et al. |
| 5,527,107 A | 6/1996 | Weibel et al. |
| 5,599,099 A | 2/1997 | Bullivant |
| 5,599,101 A | 2/1997 | Pardikes |
| 5,651,401 A | 7/1997 | Cados |
| 5,767,453 A | 6/1998 | Wakou et al. |
| 5,767,455 A | 6/1998 | Mosher |
| 5,772,319 A | 6/1998 | Pemberton et al. |
| 5,780,779 A | 7/1998 | Kitamura et al. |
| 5,843,513 A | 12/1998 | Wilke et al. |
| 5,853,244 A | 12/1998 | Hoff et al. |
| 5,896,297 A | 4/1999 | Valerino, Sr. |
| 5,980,490 A | 11/1999 | Tsoukalis |
| 5,988,983 A | 11/1999 | Furusawa |
| 6,007,236 A | 12/1999 | Maguire |
| D424,587 S | 5/2000 | Maguire |
| 6,057,514 A | 5/2000 | Maguire |
| 6,089,745 A | 7/2000 | Feistkorn et al. |

(56) References Cited

U.S. PATENT DOCUMENTS

| | | | |
|---|---|---|---|
| 6,089,794 A | 7/2000 | Maguire | |
| 6,102,562 A | 8/2000 | Bengtson | |
| 6,111,206 A | 8/2000 | Maguire | |
| 6,131,174 A | 10/2000 | Fischer et al. | |
| 6,154,980 A | 12/2000 | Maguire | |
| 6,155,709 A | 12/2000 | O'Callaghan | |
| 6,188,936 B1 | 2/2001 | Maguire et al. | |
| 6,203,184 B1 | 3/2001 | O'Callaghan | |
| 6,213,739 B1 | 4/2001 | Phallen et al. | |
| 6,338,466 B1 | 1/2002 | Wallace et al. | |
| 6,340,487 B1 | 1/2002 | Wenger et al. | |
| 6,386,841 B1 | 5/2002 | Probst | |
| 6,402,363 B1 | 6/2002 | Maguire | |
| 6,405,949 B1 | 6/2002 | Maguire | |
| 6,467,943 B1 | 10/2002 | Maguire | |
| 6,599,005 B2 | 7/2003 | Van Der Wel | |
| 6,719,453 B2 | 4/2004 | Cosman et al. | |
| 6,774,318 B2 | 8/2004 | Beal et al. | |
| 6,880,965 B1 | 4/2005 | Sheffield, Jr. | |
| 7,066,689 B2 | 6/2006 | Maguire | |
| 7,137,729 B2 | 11/2006 | Moretto | |
| 7,154,069 B1 | 12/2006 | Gordon | |
| 7,234,247 B2 | 6/2007 | Maguire | |
| 7,347,007 B2 | 3/2008 | Maguire | |
| 7,390,119 B2 | 6/2008 | Maguire | |
| 7,416,096 B2 | 8/2008 | Maguire | |
| 7,810,986 B2 | 10/2010 | Landers et al. | |
| 7,958,915 B2 | 6/2011 | Maguire | |
| 7,980,834 B2 | 7/2011 | Maguire | |
| 8,220,984 B2 | 7/2012 | Deters et al. | |
| 2001/0024400 A1 | 9/2001 | Van Der Wel | |
| 2002/0031822 A1 | 3/2002 | van der Wel et al. | |
| 2002/0136609 A1 | 9/2002 | Maguire | |
| 2003/0021181 A1 | 1/2003 | Maguire | |
| 2003/0024955 A1 | 2/2003 | Maguire | |
| 2003/0075626 A1 | 4/2003 | Maguire | |
| 2003/0142580 A1 | 7/2003 | Maguire | |
| 2003/0185095 A1 | 10/2003 | Moretto | |
| 2003/0218014 A1 | 11/2003 | Gregory et al. | |
| 2005/0039816 A1 | 2/2005 | Maguire | |
| 2005/0052945 A1 | 3/2005 | Maguire | |
| 2006/0080858 A1 | 4/2006 | Maguire | |
| 2006/0185186 A1 | 8/2006 | Maguire | |
| 2007/0289659 A1 | 12/2007 | Maguire | |
| 2007/0291578 A1 | 12/2007 | Maguire | |
| 2007/0292288 A1 | 12/2007 | Maguire | |
| 2007/0292290 A1 | 12/2007 | Maguire | |
| 2007/0297278 A1 | 12/2007 | Maguire | |
| 2008/0267004 A1 | 10/2008 | Deters et al. | |
| 2009/0126564 A1 | 5/2009 | Maguire | |
| 2009/0257832 A1 | 10/2009 | Maguire | |
| 2010/0170659 A1 | 7/2010 | Maguire | |
| 2012/0195154 A1 | 8/2012 | Maguire | |
| 2013/0135958 A1 | 5/2013 | O'Callaghan | |

FOREIGN PATENT DOCUMENTS

| | | |
|---|---|---|
| DE | 1982969 | 4/1968 |
| DE | 2 034 837 | 4/1972 |
| DE | 32 37 353 | 4/1984 |
| DE | 34 08 820 | 9/1985 |
| DE | 3433693 A1 | 3/1986 |
| DE | 35 41 532 | 5/1986 |
| DE | 39 23 241 | 1/1991 |
| DE | 43 23 295 | 2/1995 |
| DE | 196 14 688 A1 | 10/1997 |
| EP | 171291 A2 | 3/1960 |
| EP | 0 318 170 | 5/1989 |
| EP | 0 507 689 | 10/1992 |
| EP | 0 587 085 | 3/1994 |
| EP | 0 678 736 | 10/1995 |
| EP | 0 743 149 | 11/1996 |
| FR | 1167265 | 11/1958 |
| FR | 1 477 595 A | 4/1967 |
| FR | 2517087 | 5/1983 |
| GB | 1004877 | 9/1965 |
| GB | 1120270 | 7/1968 |
| GB | 1145752 | 3/1969 |
| GB | 1303459 | 1/1973 |
| GB | 2081687 | 2/1982 |
| GB | 2161090 | 1/1986 |
| JP | 59082936 | 5/1984 |
| JP | 2253835 | 10/1990 |
| JP | 4176608 | 6/1992 |
| JP | 04201522 | 7/1992 |
| SU | 1310290 | 5/1987 |
| WO | WO 87/07182 | 12/1987 |
| WO | WO 91/11689 | 8/1991 |
| WO | WO 01/49374 A1 | 7/2001 |

OTHER PUBLICATIONS

Sheet of 2 photographs of Mould-Tek gravimetric blender, circa 1993.

Sheet of 2 photographs of Motan gravimetric blender and feeding system with Maguire Products, Inc. controls, circa 1993.

Sheet of 3 photographs of UNA-DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Four page brochure entitled "Gravimix Better Quality through Research", circa 1993.

Two-sided flyer entitled "GB 140 Series Compact Auto Weigh Blender" published by Conair Franklin in the United States, Jun. 1994.

Six page brochure entitled "Graviblend Precise Continuous Weigh Blenders" published by Ktron Vertech, Jun. 1991, United States.

Six page brochure entitled "Piovan Gravimetric Blenders MDW" published by Piovan Sri, Oct. 1993, Venezia, Italy.

One page two-sided flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Two page brochure entitled "Mould-Tek Bulk Handling Systems" published by Mould-Tek Industries, Inc. in Canada, circa 1993.

Five page brochure entitled "Blending power: GXB Blender the Better Alternative" of Mould-Tek, circa 1998.

One page brochure "Una-Dyn Additive Feeder".

Two pages of advertisements from European Plastics News, pp. 76 and 75, Sep. 2000.

Four page brochure entitled "Novatec Gravimetric Blenders".

Two-sided color brochure entitled Maguire: WSB-MB Micro-Blender of Maguire Products, Inc., Jun. 1997.

Three page, two-sided color brochure entitled Maguire: Blender Selection Guide, Jun. 1997.

Two-sided color brochure entitled "Convey, Blend, Dry" published by Novatec, Inc., undated.

Three page two-sided color brochure entitled "Accuracy, flexibility and performance are at your fingertips with ConveyPacer III Series "S" Controller" of Mould-tek, 1999.

Seven page two-sided color brochure plus cover entitled "Exac-U-Batch Series Weigh Scale Blenders: Engineered to be the ultimate blend of precision and control!" of Mould-tek, 2000.

Three page two-sided color brochure entitled "We have the building blocks to integrate your entire plastics bulk handling system." of Mould-tek, 1999.

One page two-sided color brochure entitled "Saturn's comparative testing program selected Mould-Tek's GXB Blender" of Mould-tek, undated.

Advertisement entitled "Machinery and Systems for Extrusion is Our Only Business" by Process Control Corporation, circa 1993.

Advertisement "Introducing our 400 VME-II Gravimetric Blender" by HydReclaim Corporation, circa 1993.

Four page brochure entitled "Conomix Plus Volumetric Blender" dated Aug. 1993.

(56) References Cited

OTHER PUBLICATIONS

Four page brochure entitled "Conair Franklin Autocolor Y Mezclador" dated Mar. 1995.
Thirty-two page catalog entitled "Maguire Color Blending Equipment" published by Maguire Products, Inc., 1993, United States.
Brochure entitled "Plastic Molders and Extruders: published by Maguire Products, Inc., 1995".
Forty-four page two-sided brochure including cover and back pages entitled "Maguire: Auxiliary equipment for the plastics industry" of Maguire Products, Inc., Oct. 2000.
Five page two-sided color brochure entitled "Gravicolor 100: Gravimetric mixing and dosing unit" of Motan, date unknown.
Two page two-sided color brochure entitled "Model GXB-2202 Exac-U-Batch Gravimetric Scale Blender: Accurate weigh scale blending under precise computer control" of Mould-tek, 2000.
One page two-sided color brochure entitled "NovaBlend Model 600" of Novatec Inc., Jun. 1997.
International Search Report dated Aug. 7, 1998 of PCT/US98/10102.
International Search Report dated Apr. 29, 1998 of PCT/US97/23172.
Supplementary European Search Report dated Jan. 14, 2002 of EP 97954838.
Two page two-sided color brochure entitled "Optimum Series™: OL Blenders and Weigh Hoppers" of AEC HydReclaim, 2000.
Four page two-sided color brochure entitled "Optimum Series™: Gravimetric Batch Blenders" of AEC HydReclaim, 2000.
One page two-sided color brochure entitled "Guardian Batch Blender" of Process Control Corporation, date unknown.
Forty-two page brochure, plus cover of Maguire Products, Inc., "Weigh Scale Blender Technical Information—Specifications, Features", Jun. 14, 1998.
Ninety-three page brochure, plus cover of Maguire Products, Inc. Weigh Scale Blender with 'Four' Component Software—Operation and Maintenance Manual, Jun. 12, 2001.
Four page brochure entitled Plastics Product Review, Dec./Jan. 1997-98.
One page advertisement entitled "Former Processor Steve Maguire on the MicroBlender™ System", Plastics Auxiliaries, Sep. 1999.
Two page brochure entitled "Just one good idea after another", Maguire Products, Inc., undated.
One page advertisement entitled New Product Showcase: Miniature receivers allow central conveying to micro-blenders, Injection Molding, p. 230, Oct. 1998.
Two page mailing entitled "Maguire . . . More sizes . . . more options . . . more choices" of Maguire Products, Inc., undated.
Three pages entitled "Maguire blender targets small presses", Modern Plastics Show Daily, pp. 1 and 61, Jun. 18, 1997.
One page entitled "Maguire shows Micro-Blender, software", Plastics News, p. 8, Jun. 18, 1997.
One page entitled "Maguire blender targets small injection presses", Modern Plastics, p. 79, Jul. 1997.
Three page release of Maguire Products, Inc. entitled "Jun. 1997: World's Smallest Gravimetric Blender, Unveiled at NPE. Brings New Capabilities to a Wide Range of Processing Equipment".
Two page release of Maguire Products, Inc. entitled "Jun. 1998: MicroBlender receives "Best Buy" status".
One page release entitled "Jun. 2000—Maguire Alleges Patent Infringement by Novatec, Labotek, Piovan and Ferlin".
Three pages entitled "Feeders, blenders offer more exacting levels of performance", Focus, Jun. 1998, pp. 115-117.
One page advertisement "Marketplace", Canadian Plastics, Jul. 1998, p. 40.
One page advertisement of Plastics Auxiliaries, Sep. 1998, p. 63.
One page entitled "Smallest Blender Adds 'Clear-Vu' Loading", Plastics Engineering, Sep. 1998, p. 49.
Two pages entitled "Maguire's Miniature Receivers Tie Micro-Blenders to a Central Loading System", Plastics Focus, Oct. 19, 1998, p. 5-6.
Six page article entitled "It's All in the Mix", Molding Systems, Mar. 1999, pp. 24-29.
One page entitled Maguire Products—Product Data Sheet—Weigh Scale Blender—Micro Blender, Aug. 1998.
One page color advertisement entitled "Great thinkers choose the world's smartest blender", Injection Molding, Feb. 2000, p. 116.
Two page color advertisement entitled "Maguire customers respect the power of these simple words: The perfect blend of simplicity and control.", Plastics News, Mar. 8, 1999, inside cover.
Five page press release of Maguire Products, Inc. entitled "World's Smallest Gravimetric Blender, Unveiled at NPE, Brings New Capability to Wide Range of Processing Equipment", Jun. 17, 1997.
Five page press release of Maguire Products, Inc., entitled "Extrusion Control System Developed by Maguire Boosts Quality and Productivity, Costs 50% Less than Existing Equipment", Jun. 17, 1997.
One page, two-sided color brochure entitled "Bulk handling power: the manufacturer of the world's most advanced blender gives you the same performance in bulk handling systems" of Mould-Tek, dated Apr. 1999.
One page advertisement entitled "Micrabatch Gravimetric Blender" of TSM Control Systems, dated Oct. 2001.
Two page product information sheet entitled "Gravimetric Batch Blending:" of TSM Control Systems, date unknown.
Two page color brochure entitled "New Gravimetric Dosers" of Moretto P.A. s.r.l., dated 2001.
One page advertisement entitled "Ancillaries: Hoppers, Loaders & Blenders", date unknown.
Four page brochure entitled "BlendingLine: Gravicolor: Gravimetric mixing and dosing units" of Motan, Oct. 2000.
One page advertisement entitled "AEC Engineering What's Next: A Whole New Meaning to Less Is More" of AEC HydReclaim, Jun. 2000.
Three pages of Comet E-newsletter of Comet Automation Systems, Inc., distributed Fall 2002.
One page from Plastics News, Oct. 21, 2002, p. 4.
Two pages from Plastics Equipment Trends, Nov. 2002, pp. 6-7.
One page from Plastics Technology Magazine, May 2003, p. 49.
One page from Injection Molding Magazine, May 2003, p. 123.
One page from Plastics in Packaging, May 2003, p. 26.
One page from Plastics Machinery & Auxiliaries, Sep. 2003, p. 27.
Two page brochure of Comet Automatic Systems Inc. entitled "GraviMix Micro Blending System", 2002.
27 page manual entitled "Gravimix: Gravimix Micro Blending System" of Comet Automation Systems, Inc., circa 2002.
Two page brochure of GBX Blender, The Better Alternative, Mould-Tek, Nov. 1999.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circa 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Two-sided color brochure entitled Maguire: Model MPA Liquid Color Pump , Maguire Products, Inc., published Dec. 28, 1995.
International Search Report for PCT/US02/02934, dated Feb. 20, 2003.
Written Opinion for PCT/US02/02934, dated Mar. 24, 2003.

GRAVIMETRIC BLENDER WITH POWER HOPPER COVER

CROSS-REFERENCE TO RELATED PATENT APPLICATIONS AND PATENTS

This patent application is a 35 USC 120 continuation-in-part of co-pending application Ser. No. 14/666,599 filed 24 Mar. 2015 in the name of Stephen B. Maguire, which in turn was a division of now allowed U.S. patent application Ser. No. 13/345,856 filed 9 Jan. 2012 in the name of Stephen B. Maguire, which in turn is a division of U.S. patent application Ser. No. 11/454,291 filed 17 Jun. 2006, which is now U.S. Pat. No. 8,092,070.

The instant application claims the benefit of the priority of all of these applications under 35 USC 120 and incorporates the disclosures of all these patent properties to the extent permitted by applicable law.

BACKGROUND OF THE INVENTION

Field of the Invention

This invention relates generally to machines for processing plastic resin material prior to molding or extrusion, and specifically relates to gravimetric blenders. Gravimetric blenders are disclosed in U.S. Pat. Nos. 6,007,236; 6,188,936; 6,402,363; 6,467,943 and D424,587, the disclosures of all of which are incorporated herein by reference.

Description of the Prior Art

Many if not most gravimetric blenders operate with vacuum powered or other loaders that downwardly feed plastic resin material into one or more of the hoppers of the gravimetric blender, where the loaders typically are positioned on the top of the associated hoppers of the gravimetric blender. Vacuum loaders are disclosed in U.S. Pat. Nos. 6,089,794 and 7,066,689, the disclosures of both of which are incorporated herein by reference.

Older gravimetric blenders and many newer larger gravimetric blenders do not have removable hoppers; some small modern gravimetric blenders have removable hoppers. But even if removable, the hoppers cannot be removed if a vacuum loader is on top of the hopper, since the vacuum loader weighs a substantial amount, especially when filled with granular resin material.

Maguire Products, Inc. offers small capacity gravimetric blenders having removable hoppers. These small blenders with their necessarily smaller hoppers that are removable from the blender facilitate easy cleanout of the hopper by allowing removal of the hopper from the blender. A small gravimetric blender with a removable hopper is disclosed in U.S. Pat. No. 6,467,943.

If a gravimetric blender hopper has one or more loaders mounted on the hopper lid and the hopper is removable from the blender, presence of the loader(s) on the hopper lid limits, and in some cases may even eliminate, a worker's ability to remove the hopper from the gravimetric blender. A loader typically has a resin material feed line connected to it and is heavy. Vacuum loaders may weigh from 30 to 50 pounds each, making it awkward and sometimes dangerous for a worker to remove a loader from its position on the gravimetric blender hopper lid.

Moreover, the blender hopper top and hence the loader(s) are typically positioned high above the work floor, well beyond a worker's reach without using a ladder or a movable platform. This typical positioning of equipment in a plastic resin processing, molding or extrusion facility, cries for an easy way to move the loader(s) away from the hopper(s), in order to allow removal of the hopper(s) from the blender for cleaning and maintenance, without first having to remove the loader(s) from the hopper(s), by lifting the loader(s) off the hopper lid.

A previous approach to this problem has been to place a loader on a mount pivotally supported by a post, so that the loader can be swiveled out of the way by pivoting the mount around the post. Sometimes the post and mount are built with a cam or other apparatus so that a slight lift of the mount occurs on initial pivoting, to allow clearance for the loader when rotating sideways on the mount, out of the way of the hopper lid. The support post must be very substantial. The support post must additionally be fixed to a very substantial part of the gravimetric blender frame or fixed to the injection molding press or extruder to which the gravimetric blender is mounted, or even fixed to the facility floor, in order to support the loader.

SUMMARY OF THE INVENTION

This invention provides a new approach to the on-going problem in the prior art, as described immediately above. This invention raises the cover or lid (the two terms are synonymous as used herein) on the hopper(s) of the gravimetric blender, raising the cover high enough to allow removal of the hoppers underneath the lid. The invention maintains all loaders, vacuum powered and otherwise, as well as all weight associated with the loaders, mounted on the hopper cover, centered over the blender. The invention does not rotate the loaders to one side. The invention provides a simple, more stable, lower cost, safer means for dealing with the problem of heavy loaders resting on lids of gravimetric blender hoppers, whether or not the hoppers are removable from the associated gravimetric blender.

The invention controls the height to which the blender lid is raised by selection of the stroke length of pneumatically powered piston-cylinder combinations that raise the lid from the hoppers. Weight lifting capacity according to the invention is desirably set by the diameter of the cylinders of the piston-cylinder combinations. An air switch is desirably used to actuate the cylinders and thereby raise and lower the hopper lid. Any unbalanced load is handled by a center telescoping rod, which serves a part of a guide, keeping the hopper lid flat and in a horizontal position, regardless of any offset of the weight of loaders or any imbalance of the pneumatic pressures actuating the piston-cylinder combinations. The center telescoping rod and the piston-cylinder combinations are horizontally aligned, providing great stability for the hopper lid as the hopper lid is raised or lowered.

The telescoping rod desirably extends downwardly from the center of the lid, desirably into a fixed vertical tube. At one end the rod is preferably very rigidly attached to the hopper lid. The rod telescopes upwardly out of the tube, remaining vertical, thereby assuring that the lid remains horizontal and is very stable, not tending to tilt or otherwise move out of a horizontal plane, when the lid is lifted from the hoppers by actuation of the pneumatically powered piston-cylinder combinations.

Accordingly, in one its aspects this invention provides a gravimetric blender having a frame, at least one resin material storage hopper at the top of the frame including a hopper cover, a weigh bin preferably located within the frame, positioned below the hopper and adapted for downward discharge of bin contents after the contents have been weighed, at least one load cell connecting the frame and the weigh bin for sensing weight of the contents of the weigh bin, a mixer below the weigh bin for mixing contents of the weigh bin after the weighed contents fall downward from the weigh bin to the mixer, and a guide adapted for vertical movement of the cover for the hopper(s) therealong between a position at which the cover contacts and thereby closes the hopper(s) and a position at which the cover is spaced vertically above the hopper(s), whereby the hopper top(s) are open.

The invention further preferably includes means for moving the hopper cover along the guide while maintaining the hopper cover in a horizontal plane.

The invention still further preferably includes at least one piston-cylinder combination with one of the piston and the cylinder being connected to the blender frame or some other suitable part of the blender, and the other of the piston and the cylinder being connected to the cover, with the combination serving to move the hopper cover vertically, while maintaining the hopper cover in a horizontal planar orientation, along the guide.

In another aspect of the invention, the invention may further include a pair of piston-cylinder combinations, each of the combinations having either the piston or the cylinder connected to the blender frame or to some other suitable part of blender, and the other of the piston and the cylinder connected to the cover, for moving the hopper cover vertically along the guide, wherein the piston cylinder combinations are on either side of the guide and are horizontally aligned with the guide.

The guide extends vertically and is preferably located along a vertical central axis of the frame.

The invention may further include a connector in the nature of an elongated vertically oriented sleeve desirably connected to the cover and positioned between the cover and the guide, for ensuring maintenance of the cover in a horizontal position as the cover moves vertically along the guide.

In yet another of its aspects this invention provides a method for removing a gravimetric blender hopper horizontally disposed cover, vertically supporting a vacuum loader or other equipment for feeding resin material into the hopper, from the blender, for cleaning, material changeover and the like, where the method includes advancing the hopper cover upwardly from the hopper along a vertical guide while maintaining the hopper cover in a planar, horizontal orientation, by application of pneumatic pressure to a piston-cylinder combination, with one of the piston and cylinder connecting with the cover and the other of the piston and cylinder connecting with the blender frame, to a position in which the cover, which is still in a planar, horizontal disposition, is sufficiently remote from the hopper that a worker can access the coverless hopper and disconnect the hopper from the blender frame, while maintaining the hopper cover in a horizontal orientation to continue supporting the vacuum loader or other equipment for feeding resin material into the hopper. The method in this aspect yet further includes advancing the hopper while applying pneumatic pressure to a pair of piston-cylinder combinations, one each of the piston and cylinder of the combinations connecting to the cover and the other of the piston and the cylinder of the combination connecting to the blender frame. In this aspect of the method, advancement of the hopper cover further includes moving the hopper cover slidably along a vertical guide while maintaining the hopper cover in a horizontal plane.

In still yet another aspect of the invention, there is provided a method for removing a gravimetric blender hopper, having a flat cover, positioned in a horizontal plane, for vertically supporting a vacuum loader or other equipment for feeding resin material into the hopper, from the blender for cleaning, material changeover and the like, where the method includes advancing the hopper cover upwardly from the hopper slidably along a vertical guide, while maintaining the cover in a horizontal plane, to a position at which the cover is sufficiently remote from the hopper that a worker can access the coverless hopper and disconnect the hopper from the blender frame, where the method further includes maintaining the hopper cover in a horizontal orientation to continue support of the vacuum loader or other equipment for feeding resin material into the hopper. In this aspect of the invention, the advancing may be performed pneumatically.

DESCRIPTION OF THE PREFERRED EMBODIMENTS AND BEST MODE KNOWN FOR PRACTICE OF THE INVENTION

Figure 1:
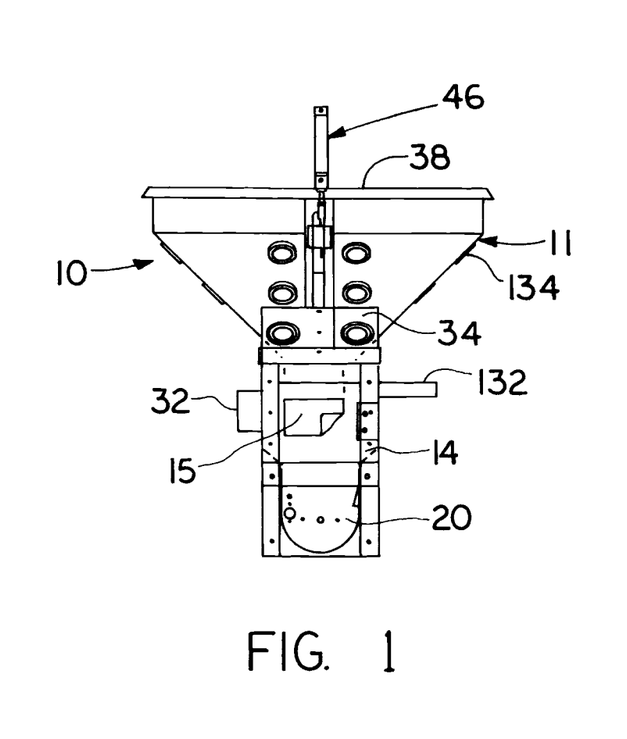
FIG. 1 is a front view of a gravimetric blender with a power hopper cover in accordance with the preferred embodiment of the invention, with the hopper cover shown in a down position, with the hoppers resultantly closed.
Figure 2:
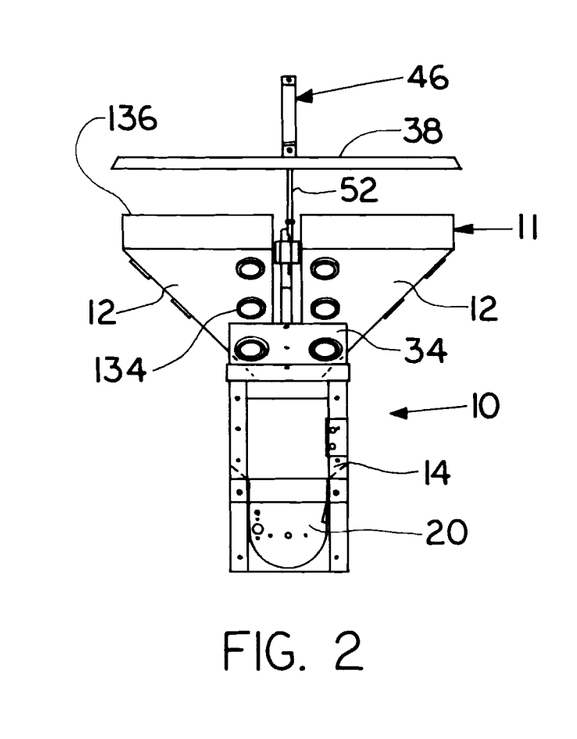
FIG. 2 is a front view, taken similarly to FIG. 1, of a gravimetric blender with a power hopper cover in accordance with the preferred embodiment of the invention, with the hopper cover shown in a raised position, with the hoppers resultantly open.

Referring to drawings in general and to FIGS. 1 and 2 in particular, a gravimetric blender is designated generally 10 and includes a hopper assembly 11 having a plurality of hoppers, which are individually designated generally 12. The hoppers 12, each of which is preferably individually manually removable from blender 10 without use of tools, are supported by a frame designated generally 14.

In a typical gravimetric blender such as that illustrated, frame 14 supports, directly or indirectly, a weigh bin 15 into which portions of solid granular plastic resin material or other granular or powdery material can be metered and then weighed prior to release into a mix chamber. The mix chamber is preferably positioned immediately below the weigh bin to receive the weigh bin contents when the weigh bin is dumped, opened or otherwise manipulated so as to drop the material that has been weighed into the mix chamber. The mix chamber is designated generally 20 in the drawings. A rotatable agitator on a shaft provides the mixing mechanism, which agitator is configured much like a beater in a home food mixer and which is desirably positioned within mix chamber 20 for rotation therein to blend the contents of weigh bin 15 as received by mix chamber 20.

Frame 14 may include four upstanding side panel members. In one preferable construction frame 14 is steel and is formed from a single sheet, bent to form three sides, as disclosed in U.S. Pat. No. 6,467,943. Alternatively, the blender frame may be constructed using steel angle members positioned at each of four corners to define the frame.

Hopper assembly 11, with the desirable plurality of hoppers 12, allows a plurality of different solid resinous materials to be dispensed from the individual hoppers 12 into weigh bin 15 by suitable valve mechanisms, which are desirably located within and proximate to the bottom of a given hopper 12. The hoppers 12 are preferably individually manually mountable on and removable from frame 14 of gravimetric blender 10.

Preferably located close to the top or upper extremity of frame 14 are outwardly flared guide flaps 34, with one guide flap on each of the four sides of the frame. In the hopper configuration illustrated in U.S. Pat. No. 6,467,943, where the frame 14 is fabricated from a single sheet bent to form three sides, three outwardly flared guide flaps 34 result. In that construction, outwardly flared guide flaps 34 are integral with and formed as a part of the solid side panels by bending the upward extremities of the solid side panels substantially into the shape illustrated in FIG. 1. In that construction a fourth outwardly flared guide flap is positioned above a fourth panel, which is a transparent removable front panel, with the fourth outwardly flared guide flap being welded to the upward extremities of two solid side panels forming a part of frame 14.

Gravimetric blender 10 further includes preferably at least one load cell used to determine the weight of the contents of weigh bin 15, and which desirably connects weigh bin 15 to frame 14. The load cell illustrated in FIG. 1 is typical and designated 32.

A pneumatically actuated piston-cylinder combination may be used to move a desirably pivotable bottom portion of weigh bin 15, thereby to cause the contents of weigh bin 15 to drop therefrom into mix chamber 20.

Still referring principally to FIG. 1, gravimetric blender 10 includes a horizontal, flat hopper cover 38 positioned above hopper assembly 11 and movable vertically, while being maintained in a horizontal plane, in a manner so as to close the hoppers 12 of hopper assembly 11 when hopper cover 38 is in a lower position, and to open and thereby permit access to individual hoppers 12 of hopper assembly 11 when hopper cover 38 is in a raised position, remote from hoppers 12 of hopper assembly 11. In FIG. 1 gravimetric blender 10 is illustrated with hopper cover 38 in position on the top of and contacting hoppers 12, thereby covering the hoppers 12 of hopper assembly 11 and precluding access to the interior of hoppers 12 and further essentially precluding removal of hoppers 12 so long as hopper cover 38 is in the position illustrated in FIG. 1.

In FIG. 2 gravimetric blender 10 is illustrated with hopper cover 38 raised from the position illustrated in FIG. 1, with hopper cover 38 no longer covering hoppers 12 of hopper assembly 11, thereby permitting access to individual hoppers 12 from the top thereof and permitting easy removal of individual hoppers 12 from gravimetric blender 10. Note that hopper cover 38, which is flat, remains in a horizontal plane when blender 10 is in the "hopper open" position illustrated in FIG. 2.

Figure 5:
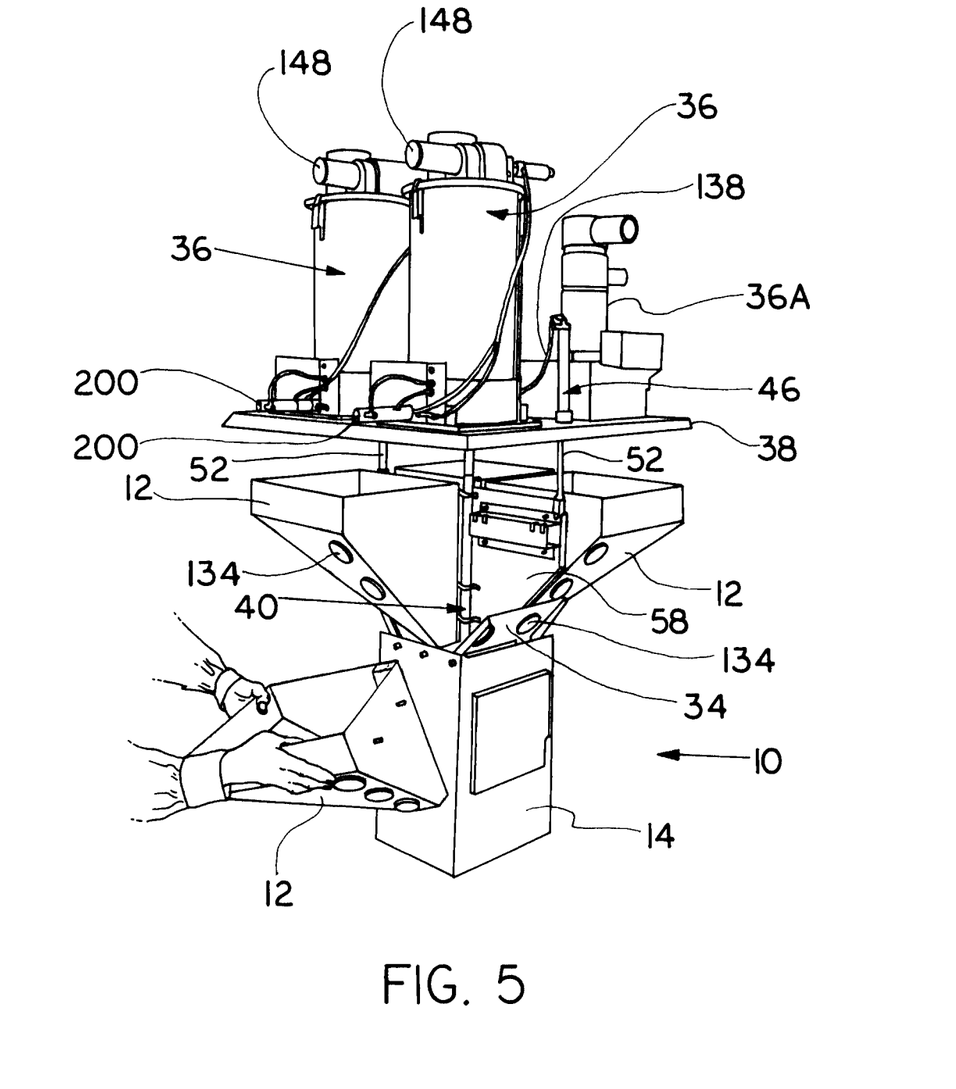
FIG. 5 is an isometric view of a gravimetric blender with a power hopper cover in accordance with the invention, with resin loading apparatus depicted in place on the hopper cover, with the hopper cover shown in a raised position and with the hoppers resultantly open, illustrating a worker having removed a hopper from the gravimetric blender for material refill, changeover or maintenance purposes.
Figure 6:
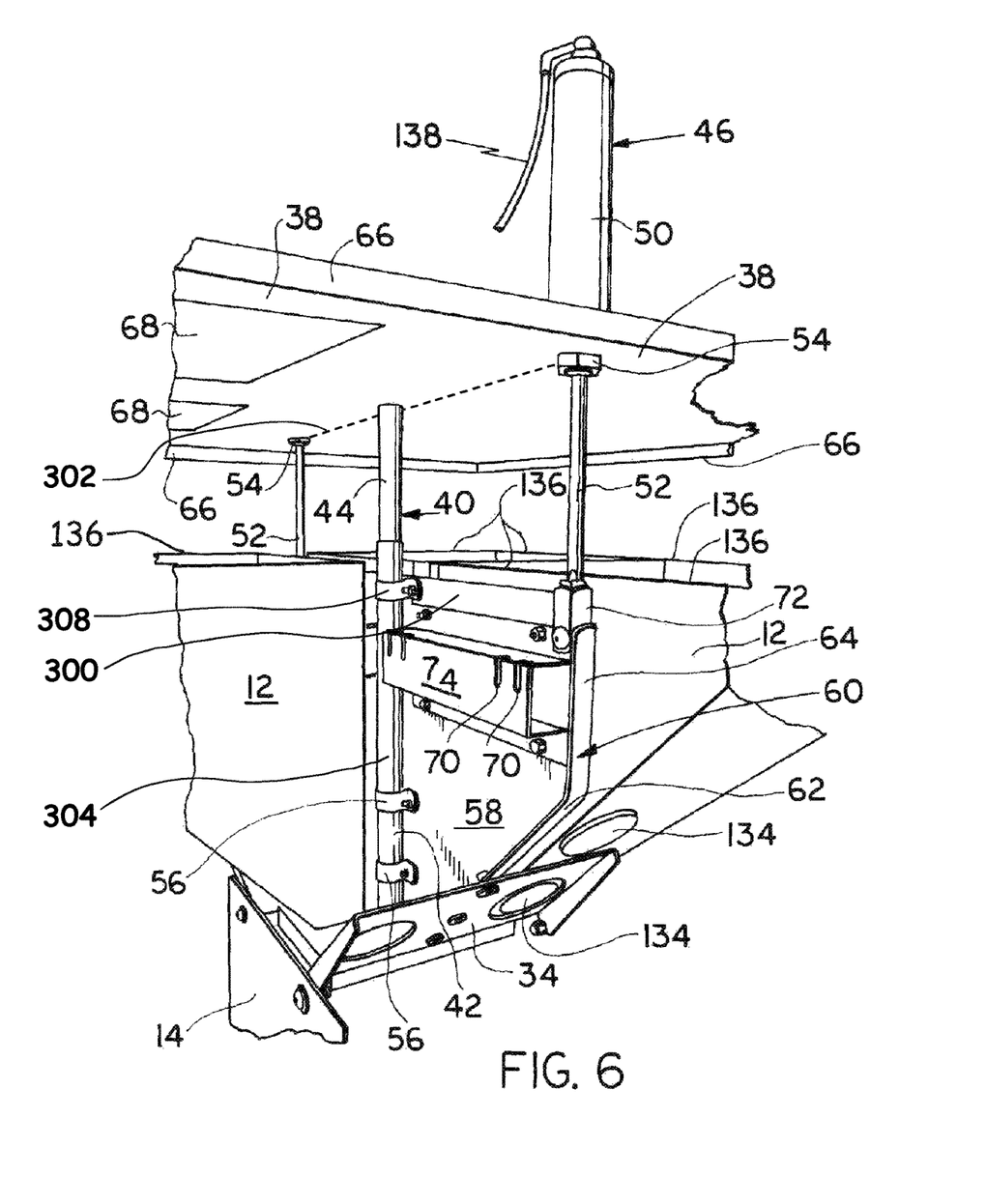
FIG. 6 is an enlarged broken isometric view of the upper portion of a gravimetric blender having a power hopper cover in accordance with the invention, with the hopper cover shown in a raised position with the hoppers resultantly open, where the view has been taken at a position similar to FIG. 5 but closer to the blender, so as to show more detail.

Hopper cover 38 is moved vertically by action of at least one and desirably a pair of piston cylinder combinations designated generally 46 in FIGS. 1 and 2. Only one piston-cylinder combination of the pair is visible in FIGS. 1 and 2 since the pair of piston-cylinder combinations 46 are horizontally aligned with and positioned on either side of a vertical guide for hopper cover 38, where the vertical guide is designated 40 and is shown in FIGS. 5 and 6. The second piston-cylinder combination 46 is immediately behind and therefore hidden by the first piston-cylinder combination 46 visible in FIGS. 1 through 4.

Piston-cylinder combinations 46 are desirably of the conventional type that incorporate an internal spring to provide spring return of the piston from the advanced position illustrated in FIG. 6. Such internal springs that are part of conventional piston-cylinder combinations 46 provide spring return of the piston from the advanced position upon de-energization of the cylinder portion of the piston-cylinder combination 46, thereby resulting in the piston 52 retracting into cylinder 50 of piston-cylinder combination 46. Upon such retraction of pistons 52 into cylinder 50, when piston-cylinder combinations 46 are used in connection with the invention as illustrated in FIG. 6, hopper cover 38 returns to its position atop hoppers 12 as illustrated in FIGS. 1 and 3.

Piston-cylinder combinations 46 which include piston rods 52 are maintained in horizontal alignment with vertical guide rod 40 by a brace 300 which extends horizontally between each of piston-cylinder combinations 46 and vertical guide 40. Suitable nuts and bolts, together with a wrapper piece 308 are used to secure brace 300 to a stationary tubular portion of vertical guide 40, where the stationary tubular portion is designated 304 in FIG. 6. Brace 300 as secured to metal strap 308 is similar to clamp 56 illustrated in FIG. 6. Receptacles 72 for piston rods 52 are secured to brace 300 by suitable nut and bolt combinations, not illustrated in the drawing, or by welding, if desired, of brace 300 to receptacle 72.

While only one portion of brace 300 is visible in FIG. 6, it is to be understood that brace 300 is desirably a single piece of metal that extends from receptacle 72 to the left in FIG. 6, is secured about tubular portion 304 of vertical guide 40 by metal strap 308 and extends on to be connected with the remaining receptacle 72, which is not visible in FIG. 6 due to the presence of hopper 12. Brace 300 is desirably a single straight piece of strong, rigid metal, preferably steel, providing horizontal alignment of piston-cylinder combinations 46, and particularly piston rods 52 with vertical guide 40. The construction illustrated in FIG. 6, with brace 300 providing structural rigidity for the hopper cover lift mechanism, assures that the hopper cover when raised always remains in a horizontal plane. There is no relative skewness or movement or shifting of piston rods 52 relative to one another or relative to vertical guide 40 due to the rigid construction provided by the presence of brace 300 and the associated hardware. In FIG. 6, a guide line 302 has been drawn on the underside of the hopper cover 38 to illustrate the horizontal alignment of piston rods 52 and vertical guide 40. Note that guideline 302, provided for visual understanding of the drawings, is not necessary to be present on the underside of the hopper cover. Guide line 302 as show intersects vertical guide 40, and specifically telescoping tube 44 thereof, and nut-bushing combinations 54 through which piston rods 52 slidably travel.

Figure 3:
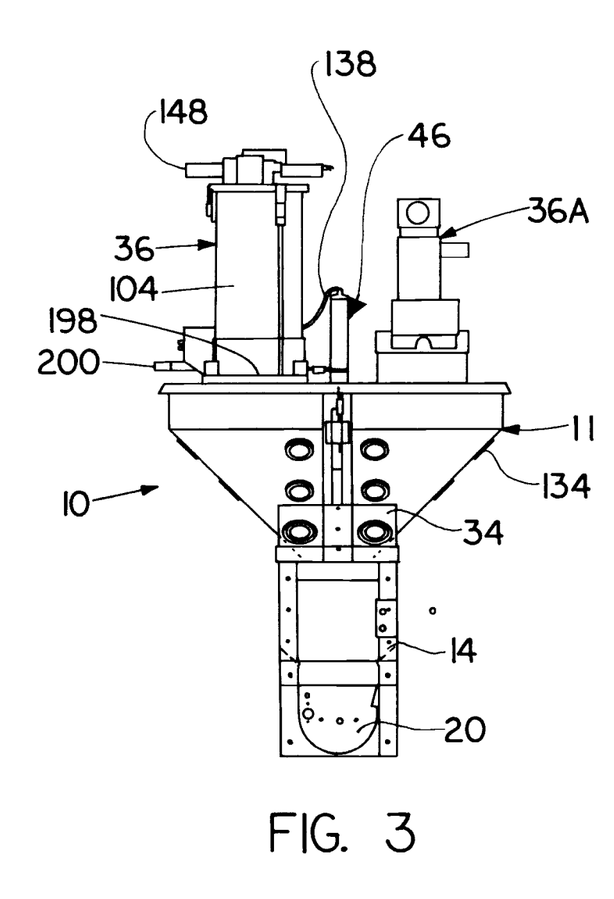
FIG. 3 is a front view of a gravimetric blender having a power hopper cover in accordance with the invention, with the view taken similarly to FIGS. 1 and 2, with resin loading apparatus depicted in place on the hopper cover, with the hopper cover shown in a down position, with the hoppers resultantly closed.
Figure 4:
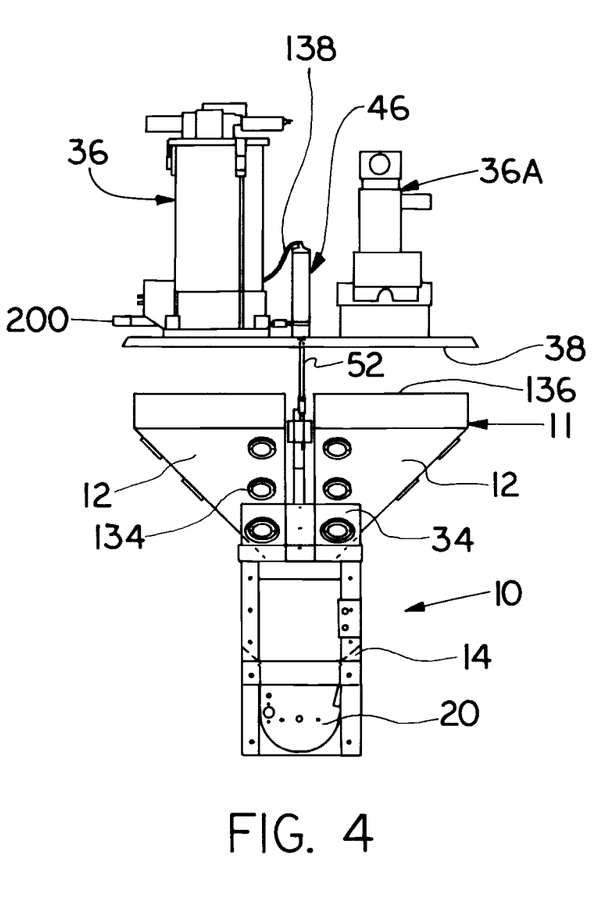
FIG. 4 is a front view of a gravimetric blender having a power hopper cover in accordance with the invention, with the view taken similarly to FIGS. 1, 2 and 3, with resin loading apparatus depicted in place on the hopper cover, with the hopper cover shown in a raised position, with the hoppers resultantly open.

Load cell 32, weigh bin 15 and pneumatic piston-cylinder combination 132, shown in FIG. 1, are not illustrated in FIGS. 2 through 4 to enhance drawing clarity.

As further shown in FIGS. 1 and 2, hoppers 11 may have inspection ports formed therein. Additionally, guide flaps 34 may also be apertured so as to provide access to the inspection ports. The inspection ports in FIGS. 1 and 2 have been numbered 134. Inspection ports 134 are typically sight glasses installed in the hopper walls with suitable gasketing surrounding the sight glasses. Only some of the inspection ports 134 have been numbered in FIGS. 1 and 2 in order to enhance drawing clarity.

As apparent in comparing FIG. 1 and FIG. 2, when piston-cylinder combinations 46 are unactuated, with piston rods 52 of piston-cylinder combinations 46 within the cylinders 50 of piston-cylinder combinations 46, as illustrated in FIG. 1 where piston rod 52 substantially cannot be seen due to being within cylinder 50 of piston-cylinder combination 46, the hopper cover 38 is in a lower position, where it may contact and close the open tops of hoppers 12 comprising hopper assembly 11. When piston-cylinder combinations 46 have been actuated and piston rods 52 have extended therefrom as illustrated in FIG. 2, this lifts flat, horizontal hopper cover 38 vertically from the hoppers 12, where the upper edges of the hopper walls have been designated 136 in FIG. 2. This lifting action is effectuated as a result of the cylinder portions 50 of piston-cylinder combinations 46 being fixedly connected by their nose mounts to hopper cover 38. The piston-combinations are upside down relative to conventional positioning and usage of such piston-cylinder combinations.

Referring to FIGS. 3 and 4, the gravimetric blender depicted in FIGS. 1 and 2 is shown again with the gravimetric blender in FIG. 3 being in essentially the same configuration as the gravimetric blender of FIG. 1, that is with the hopper cover 38 preferably contacting the upper extremities 136 of hoppers 12 thereby closing hoppers 12 and precluding access to the interior of hoppers 12 and also essentially precluding removal of hoppers 12 from gravimetric blender 10. FIG. 4 is similar to FIG. 2 in that it depicts hopper cover 38 raised from and no longer contacting upper extremities 136 of hoppers 12 so that an operator may have access to the interior of hoppers 12 and may remove one or more hoppers 12 from gravimetric blender 10. As noted above, in FIGS. 3 and 4, similarly to FIG. 2, weigh bin 15, piston-cylinder combination 132 which dumps weigh bin 15, and load cell 32 have not been illustrated to enhance drawing clarity.

In FIG. 3 a vacuum actuated resin loader of the type disclosed in U.S. Pat. Nos. 6,089,794 and 7,066,689 and which is available from Maguire Products, Inc. in Aston, Pa., is depicted mounted on the upper surface of hopper cover 38. Additionally, a generic material loader has also been depicted mounted on the upper surface of hopper cover 38, where the generic material loader is designated 36A.

Vacuum actuated resin loader 36 receives granular resin material through an inlet port designated generally 148 in the drawings, with granular resin material filling a receiver designated generally 104 in the drawings. Resin loader 36 provides granular resin to the particular hopper 12 located immediately below resin loader 36 upon opening of a suitable, preferably pneumatically powered, valve, typically in the form of a slide gate, which has been designated generally 198 in the drawings. The piston-cylinder combinations that are desirably pneumatically powered and which operate the slide gate valve 198 at the lower extremity of loader 36 are illustrated in FIG. 5 and designated generally 200.

Referring to FIG. 5, where a worker's hands are shown, with the worker having removed one of hoppers 12 from gravimetric blender 10, hopper cover 38 is illustrated in the raised position with two resin loaders 36 illustrated mounted on hopper cover 38 and a generic loader 36A is also illustrated mounted on hopper cover 38. In FIG. 5 it is apparent that the resin loader 36 illustrated closest to the viewer, is the loader for the hopper 12 that has been removed from gravimetric blender 10, and that the remaining resin loader 36, to the left in the drawing, is the resin loader servicing the hopper 12 remaining mounted on gravimetric blender 10, where this hopper 12 is on the left hand side of the drawing.

FIG. 5 further illustrates that there are two piston-cylinder combinations 46 used to raise and lower hopper cover 38. While only one piston-cylinder combination 46 is visible in FIG. 5, two horizontally aligned piston rods 52, one for each of the piston-cylinder combinations 46, are illustrated. Additionally, located desirably at the center of hopper cover 38 and positioned essentially at the center and preferably running along a central vertical axis of blender 14, is a vertical guide, designated generally 40, for hopper cover 38 as hopper cover 38 goes up and down under the influence of pneumatic piston-cylinder combinations 46. Vertical guide 40 includes two parts, a tube 42 that is secured to frame 14 of gravimetric blender 10, and a rod 44 that telescopes slidably within tube 42 and is fixed to hopper cover 38. The sliding, telescoping arrangement of vertical guide 40, with tube 42 slidably receiving rod 44, is best seen in FIG. 6, which is drawn to a larger scale than FIG. 5. Vertical guide 40 and piston-cylinder combinations 46 are horizontally aligned as explained above and as depicted in FIG. 6.

Referring to FIGS. 5 and 6, two separation plates 58, only one of which is fully illustrated in FIGS. 5 and 6, extend in opposite directions away from the central vertical axis of blender 10, with each separation plate 58 forming a part of the structure for receiving a respective piston rod 52 associated with a respective piston-cylinder combination 46. Separation plate 58 illustrated in FIGS. 5 and 6 connects to a strap 60 which has an angled portion 62 and a vertical portion 64, as illustrated in FIG. 6. The connection of separation plates 58 to strap 60 may be by welding or via suitable screw-nut-angle combinations.

Separation plate 58 connects with and holds tube 42 of vertical guide 40 via conventional circular clamps 56, which wrap around the outside of tube 42 and tighten thereabout when clamps 56 are secured to separation plate 58 by suitable screw-nut combinations. The screw-nut combinations are not numbered to enhance drawing clarity. Three such circular clamps 56 are illustrated in FIG. 6.

With continued reference to FIG. 6, hopper cover 38 has a plurality of apertures, two of which are shown in FIG. 6 and designated generally 68, for flow downwardly of granular resin material from the resin loaders 36 mounted on the top of hopper cover 38, into individual hoppers 12. In FIG. 6 an aperture 68 is illustrated on the left-hand side, in position to facilitate downward flow and fill of the hopper 14, which has been removed from gravimetric blender 10 as illustrated in FIG. 5. A second aperture 68 is also illustrated in hopper cover 38, at a position to facilitate filling of hopper 12 appearing on the left-hand side of FIG. 6.

Typically, valves for permitting and halting downward flow of resin material from loader 36 are a part of a loader 36 and are actuated by pneumatic piston-cylinder combinations forming a part of loader 36; these piston-cylinder combinations have been designated 200 and are visible in FIG. 5. Bolts and nuts secure resin loaders 36 to the upper surface of hopper cover 38. The bolts extend through hopper cover 38 and are secured by suitable nuts; neither have been illustrated in FIG. 6 in order to enhance the clarity of the drawing.

Generally rectangular, hollow, somewhat elongated hopper support boxes 74 are preferably secured to each separation plate 58 by suitable nut-bolt combinations as illustrated in FIG. 6. Hopper support box 74 is elongated in a direction parallel with the associated separation plate 58, running transversely to vertical guide 40. Hopper support box 74 includes suitable apertures 70 formed as slots opening in the upwardly facing surface of hopper support box 74, which upwardly facing surface is not numbered in FIG. 6, and extending downwardly in a lateral surface of hopper support box 74, which also is not numbered in FIG. 6 but which facingly contacts a hopper 12 when a hopper 12 is in position. Hopper 12 desirably is equipped with bolts extending outwardly therefrom, as illustrated in FIG. 5, so that the bolt heads, or engaged nuts, may fit into and slide downwardly within the slots 70 in hopper support box 74. This provides added vertical support for hoppers 12 when in place within gravimetric blender 10 and lends rigidity to the entire assembly of separation plate 58, strap 60, vertical guide 40 and piston rods 52.

The extremities of piston rods 52 that are remote from driving pistons 48 resident within cylinders 50 of piston-cylinder combinations 46, are secured to separation plate 58 via rod receptacles 72 that retain the extremity ends of piston rods 52 and are preferably secured to separation plate 58 by suitable nut-bolt combinations. Accordingly, since separation plate 58 is connected to guide flap 34, which is a part of frame 14 of gravimetric blender 10, and since rod receptacle 72 is fixed to separation plate 58, actuation of piston-cylinder combinations 46 and resultant extension of piston rod 52 pushes hopper cover 38, and all of the structures, including the resin loaders, supported by hopper cover 38 upwardly as piston rods 52 extend from piston-cylinder combinations 46 through nut-bushing combinations 54.

As illustrated in FIG. 6, hopper cover 38 includes a downwardly extending lip 66 preferably extending around the entire periphery of hopper cover 38.

The height to which piston-cylinder combinations 46 raise hopper cover 38 from the upper edges 138 of hoppers 12 is controlled by the stroke length of piston-cylinder combinations 46. The weight lifting capacity is established by the inner diameter of cylinders 50 of piston-cylinder combinations 46.

An air switch is used to actuate the piston-cylinder combinations 46 and thereby raise hopper cover 38. Any imbalance in the load presented by hopper cover 38 and the resin loaders and other items which may be supported by hopper cover 38 is handled by the guide 40 consisting of rod 44 telescoping into tube 42. The presence of vertical guide 40 together with the two piston-cylinder combinations located on either side of guide 40, with guide 40 being in alignment with the piston rods 52 of piston-cylinder combinations 46, serves to keep hopper cover 38 flat and horizontal regardless of any offset in the load carried by hopper cover 38 and regardless of any imbalance in the supplied air pressure as between the two piston-cylinder combinations 46.

Rod 44 is rigidly attached to blender cover 38. Since rod 44 telescopes upwardly out of tube 42, that action together with the rigid connection of rod 44 and hopper cover 38, with rod 44 being oriented transversely to hopper cover 38, assures that hopper cover 38 remains horizontal. Furthermore, vertical guide 40 helps to handle any unbalanced load in the event one occurs and serves to keep blender cover 38 flat in the event of an offset in the pneumatic pressures applied to piston-cylinder combinations 46.

With the invention, unlike prior gravimetric blenders, the hopper cover is preferably not supported by the hoppers. Rather, the hopper cover is preferably supported by the piston rods 52 being mounted via rod receptacles 72 to separation plates 58 and hence to frame 14. In other words, hopper cover 38 goes up and down, and when down may contact the upper extremities 136 of hoppers 12, but hopper cover 38 preferably does not rest on hoppers 12 even when hopper cover 38 is in contact with hoppers 12.

With the two piston-cylinder combinations 46, one on either side of the vertical guide, the invention can be operated to lift the hopper cover 38 two inches, four inches, six inches or whatever height is required. All that need be done is to change out one set of piston-cylinder combinations and replace with a second set of different size, to provide any required different lift height. Not only does the power hopper cover 38, when at its extreme vertical upward position, provide clearance for hopper removal, this also provides easy cleaning of the bottoms of resin loaders 36.

Desirably, rod receptacles 72 receive a clevis connected to the end of piston rod 52, with rod receptacles 72 including a pin connection of the clevis to the separation plate 58, which is located between adjacent hoppers 12 and which becomes the support for the hopper cover and the loaders mounted on the hopper cover, as discussed generally above.

In FIG. 6, the structure, particularly the bolts and nuts securing resin loaders 36 to the upper surface of hopper cover 38, which securing structure would be visible looking at the lower or bottom surface of hopper cover 38, has not been shown in order to enhance drawing clarity.

Another factor making the resin loaders difficult to handle and sometimes dangerous to remove, is that the resin loaders usually have material lines connected to them. As a result, to remove a loader from the gravimetric blender, it might be necessary either to disconnect the material line, thereby requiring a worker to make provision for the material that will be spilled from that line, or to leave the line connected to the loader as the loader is lifted off the hopper cover. If the line remains connected, this makes the job of removing the loader even more difficult since the lifting is more awkward with the material line attached. Additionally, the loader would being even heavier and therefore more difficult to handle than usual.

The following is claimed:

1. A gravimetric blender for receiving separate resin-related material components, weighing them according to a predefined recipe, and mixing the weighed components to produce a blend of resin material for molding or extruding plastic products, comprising:
   a) a frame including upstanding side panels with outwardly flared guide flaps defining upper extremities of the side panels;
   b) a plurality of resin material storage hoppers supported by the frame, the hoppers having open tops, all of the tops being co-planar one with another, the hoppers being laterally spaced from one another;
   c) a cover overlaying all of the open hopper tops;
   d) at least one load cell connecting the frame and a weigh bin, for sensing weight of the weigh bin;
   e) the frame further including i) a single tubular guide aligned with the center of the cover, oriented perpendicularly thereto, and positioned equidistant from each of the hoppers of the plurality for movement of the hopper cover vertically therealong;
ii) a longitudinally elongated brace connected to the tubular guide at the midpoint of the brace; and
iii) a pair of separation plates connected to the guide flaps and extending upwardly therefrom, the separation plates being connected to the tubular guide and extending therefrom in vertical alignment with the brace; and
iv) a horizontal hopper support box connected to the separation plates and extending longitudinally therealong below the brace;
v) a pair of upstanding straps connected to the same guide flaps as those to which the separation plates are attached;
f) piston-cylinder combination having extremities of the piston rods of the piston-cylinder combinations connected to the frame and the cylinders of the piston-cylinder combination connected to the upper surface of the hopper cover for moving the hopper cover upwardly and downwardly along the guide;
g) outboard extremities of the brace supporting receptacles receiving ends of piston rods of the piston-cylinder combinations and being connected to the upstanding straps;
h) the guide slideably receiving a rod fixedly connected to the hopper cover at the center thereof, the piston-cylinder combinations being horizontally aligned with the rod.

2. A method for moving a gravimetric blender horizontal, flat hopper cover, the blender being used for receiving separate resin-related material components, weighing them according to a predefined recipe, and mixing the weighed components to produce a blend of resin material for molding or extruding plastic products, the gravimetric blender further including a frame, a plurality of resin material storage hoppers supported by the frame, a bin for receiving resin material from the hoppers, a load cell for sensing weight of the bin and any contents therein, a mixer for mixing contents of the bin, the hopper cover supporting a vacuum loader for feeding resin material into the hopper for blender cleaning, and material changeover, the method comprising:
  a) applying pneumatic pressure to a vertically oriented piston-cylinder combination the cylinder of the piston-cylinder combination being mounted on the upper surface of the hopper cover and exterior ends of piston rods of the piston-cylinder combination being connected to the frame thereby advancing the hopper cover vertically away from the hopper along a tubular guide vertically aligned with the center of the hopper cover and vertically aligned with the piston rod of the piston-cylinder combination, the tubular guide being below the hopper cover and affixed to the frame, to a position at which the cover is remote from the hopper so that requisite blender cleaning and material changeover can be performed, while maintaining the hopper cover in a horizontal orientation by supporting the hopper cover with the piston-cylinder combination, so that the flat horizontal hopper cover continues supporting the vacuum loader for feeding resin material into the hopper.

3. The method of claim 2 in which moving the hopper cover further comprises applying fluid pressure to a pair of piston-cylinder combinations each being affixed to the cover and connected to the blender frame, the piston-cylinder combinations and the guide being horizontally aligned.

4. In a gravimetric blender for receiving separate resin-related material components, weighing them according to a predefined recipe, and mixing the weighed components to produce a blend of resin material for molding or extruding plastic products, the gravimetric blender including a frame, a hopper, a flat, horizontally oriented hopper cover, a bin for receiving resin material from the hopper and discharging the resin material after the resin material has been weighed, a load cell for sensing weight of the bin and any resin material therein, and a mixer for mixing resin material weighed in the bin, the improvement consisting of only:
  a) a pair of pneumatic piston-cylinder means fixedly connected to the hopper cover and frame at respective lateral extremities thereof for moving the hopper cover vertically towards and away from the hopper while maintaining the hopper cover horizontal; and
  b) tubular means, connected to the frame below the hopper cover, slideably receiving a rod fixedly extending downwardly from the center of the hopper cover for guiding the hopper cover along a vertical path during vertical movement thereof.

5. The improvement to the gravimetric blender of claim 4, further comprising means for maintaining the hopper cover horizontal during vertical movement thereof.

\* \* \* \* \*